United States Patent Office 3,641,130
Patented Feb. 8, 1972

3,641,130
PROCESS FOR THE PRODUCTION OF AROMATIC POLYCARBOXYLATES
Donald G. Kuper, Bartlesville, Okla., assignor to Phillips Petroleum Company
No Drawing. Filed Mar. 10, 1969, Ser. No. 805,855
Int. Cl. C07c 51/00, 51/52
U.S. Cl. 260—515 P
9 Claims

ABSTRACT OF THE DISCLOSURE

Improved catalytic disproportionation of aromatic carboxylates to aromatic polycarboxylates containing at least one additional carboxyl group is achieved by utilizing at least one compound of the formula R—X—M wherein R is an alkyl, aryl, or alkyl-substituted aryl radical, X is oxygen or sulfur and M is hydrogen or an alkali metal as a catalyst adjuvant in combination with a conventional disproportionation catalyst system.

BACKGROUND OF THE INVENTION

It is known that alkali metal salts of various carboxylic acids having one or more carboxyl groups attached to an aromatic ring system can be converted into salts of the corresponding carboxylic acids having at least one additional carboxyl group in the molecule by thermal conversion or catalytic disproportionation at elevated temperatures and pressures. While such a process has proven industrially attractive for the production of various types of polycarboxylic acids such as terephthalic acid, the process as heretofore practiced suffers from the disadvantage exhibiting relatively low efficiency. In addition the handling of the high pressure systems to obtain conversion requires the use of expensive high pressure equipment.

THE INVENTION

It is thus an objct of the present invention to provide an improved process for the catalytic formation of polycarboxylic acids.

Another object of the present invention is to provide a process for the formation of alkali metal salts of aromatic polycarboxylic acids.

Another object is to provide an improved catalytic disproportionation system for formation of salts of polycarboxylic acids.

Other aspects, objects and the several advantages of this invention will be apparent from the following specification and claims.

In accordance with this invention, I have discovered that in the process for the formation of aromatic polycarboxylates by disproportionation of an alkali metal salt of the corresponding carboxylic acids containing at least one less carboxyl group an efficient system is achieved, giving good conversion to the desired alkali metal salts of said polycarboxylic acids which is operable at pressures lower than heretofore generally possible by carrying out the disproportionation reaction in the presence of a conventional disproportionation catalyst and at least one adjuvant compound of the formula R—X—M wherein R is an alkyl, cycloalkyl, aryl, or combination thereof such as an alkyl-substituted aryl radical and the like having from 1 to 15 carbon atoms, X is oxygen or sulfur and M is hydrogen or an alkali metal.

Thus by the present invention the conversion of an alkali metal aromatic carboxylate to the corresponding aromatic polycarboxylate having at least one additional carboxyl group which can be subsequently converted to the corresponding aromatic polycarboxylic acid is readily carried out in an efficient system when one or more adjuvant compounds of the formula R—X—M, as above defined, are utilized as a catalyst adjuvant.

In addition, use of the adjuvant-containing system of the instant invention permits the conducting of the reaction efficiently at low pressures.

In one presently preferred embodiment of this invention, I have discovered that an alkali metal benzoate is readily converted to the respective alkali metal salt of terephthalic acid at low pressure but in good yield by the addition of an alkali metal phenoxide or alkali metal thiophenoxide as an adjuvant to the conversion system.

The disproportionation process of this invention for potassium benzoate can be represented as follows:

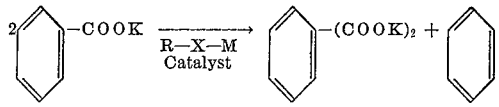

wherein X is oxygen or sulfur, M is an alkali metal, and n is 1, 2, or 3 and R is an alkyl, cycloalkyl, aryl or combination thereof such as alkyl-substituted aryl radical having from 1 to 15 carbon atoms therein.

As starting materials for the process of this invention, in addition to the presently preferred alkali metal salts of benzoic acid, the salts of other aromatic mono or polycarboxylic acids may be used. Such salts are those of the formula

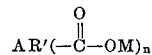

wherein AR′ is an aromatic or alkyl aromatic group having 6 to 15 carbon atoms therein, M is an alkali metal and n is 1, 2, or 3.

In carrying out the conversion of compounds of the formula AR—(COOM)$_n$ advantageously, the alkali metal salts, preferably the potassium salts or the sodium salts, are used. The lithium, rubidium and cesium salts can also be used for this reaction. In the place of the salts, mixtures can also be used which are transformed into the salts upon heating, for example, mixtures of carboxylic acid, anhydrides and alkali metal carbonates. Mixtures of salts of two different metals, for example, mixtures of the sodium and potassium salts can be used.

Such salts are readily prepared from the corresponding acids. Such acids include, for example, benzoic acid, 2-naphthalenecarboxylic acid, 4-biphenylcarboxylic acid, 2,6-naphthalenedicarboxylic acid, phthalic acid, isophthalic acid, terephthalic acid, 2-anthracenecarboxylic acid, 1,5-anthracenedicarboxylic acid, 1,5,9-anthracenetricarboxylic acid, 3-phenanthrenecarboxylic acid, 1,4,9-phenanthrenetricarboxylic acid, 2,3,4-trimethylbenzenecarboxylic acid, 2,4,6-trimethylbenzene-1,3-dicarboxylic acid, 2-ethyl-4-hexyl-6-methylbenzene-1,3-dicarboxylic acid, 2,4 - dibutylbenzene - 1,3,5 - tricarboxylic acid, and the like. Also, mixtures of such acids can be used. In all of these carboxylic acids, the aromatic ring can carry alkyl radicals in addition to the carboxyl groups. If aromatic monocarboxylic acid salts are used as starting materials for the performance of the process according to the invention, the reaction products obtained thereby are industrially valuable dicarboxylic acid disalts and, in many cases, are those dicarboxylic acid disalts which have a symmetric structure, for example, terephthalic acid disalt, naphthalene-2,6-dicarboxylic acid disalt, and the like.

The aromatic polycarboxylates which are produced according to the process of this invention can be recovered by any means known to the art. It is also within the scope of this invention to convert such aromatic polycarboxylates into the respective aromatic polycarboxylic acids and subsequently recover such acids by any means known to the art.

For example, the reaction product is first dissolved in water and thereafter the insoluble components are filtered off. Subsequently, the salts formed by the reaction can be transformed into the corresponding free acids by acidifying the filtered solution with organic or inorganic acids or by introducing sulfur dioxide into the filtered solution at atmospheric or elevated pressure, and then separating the free acids from the acidified solution. The individual reaction products may be separated from each other and isolated in pure form by methods which are based upon their different solubilities or volatilities and may thereafter, if desired, be transformed into their derivatives. The salt mixture produced by the reaction may also be transformed directly into derivatives of the acids, for example, into their esters or halides, and these derivatives may be purified, if desired, by fractional distillation.

The resulting polycarboxylic acids which are ultimately produced from the salts which are produced through use of the process of this invention are well known to the art and are useful for a variety of purposes.

For example, the process can be used to convert potassium benzoate to potassium terephthalate which is readily converted to terephthalic acid. Terephthalic acid has at least three major applications at present. Perhaps the most important of such applications is in the manufacture of synthetic fibers of the polyester type. Also of considerable importance is the use of terephthalic acid as an intermediate for the preparation of polyester film. Considerable quantities of terephthalic acid are also employed in the manufacture of terephthalic acid based plasticizers.

The process of this invention can be effected in a batchwise or continuous manner. Conventional equipment can be employed.

The process of this invention constitutes a further valuable improvement over prior art methods in that high pressures do not need to be employed to effect substantial yields. The resultant savings in equipment outlay and compression costs constitute a significant economic advantage.

It is essential to the process of this invention that a compound of the type R—X—M (as described above) be employed. Such adjuvants are generally employed in the range of about 0.001 to 2 mols per mol of alkali metal aromatic carboxylate, more preferably in the range of about 0.1 to 0.5 mol per mol of aromatic carboxylate.

Examples of suitable compounds of the formula R—X—M include sodium phenoxide, lithium phenoxide, rubidium phenoxide, cesium phenoxide, sodium thiophenoxide, lithium thiophenoxide, rubidium thiophenoxide, cesium thiophenoxide, potassium 2,4,6-tripropylphenoxide, potassium 3,5-dibutylphenoxide, sodium 4-thiobiphenyloxide, sodium 2-hexyl-6-propylthiophenoxide, sodium 2,3,5-trimethylthiophenoxide, lithium 4-methylthiophenoxide, sodium 2-naphthoxide, potassium 4-biphenyloxide, potassium 2-anthroxide, phenol, thiophenol, potassium phenoxide, potassium thiophenoxide, methanol, methyl mercaptan, ethanol, ethyl mercaptan, 1-decanol, 3-decanol, sodium methoxide, lithium ethoxide, rubidium naphthyloxide, cesium 3-decyloxide, sodium naphthyloxide, sodium cyclopentyloxide, potassium cyclodecyloxide, potassium 3-pentylcyclopentyloxide, potassium 4-cyclohexylbutyloxide, sodium benzyloxide, sodium thiobenzyloxide, sodium 2-methylphenoxide, cyclopentanol, cyclodecanol, 2-naphthalenol, benzyl alcohol, 2,4-dimethylcyclopentanol, 3-pentylcyclopentanol, 4-cyclohexylbutanol, 3-pentylcyclopentanol, 2-methylphenol and 2-methyl thiophenol.

It is also essential to the process of this invention that a suitable catalyst be employed in the reaction medium. Generally, in the range of about 0.1 to 100 g. of catalyst per mol of alkali metal aromatic carboxylate are employed, more preferably in the range of 1 to 50 g. per gram mol are employed.

Catalysts which can be employed according to the process of this invention include cadmium, zinc, iron, lead, and mercury, as well as compositions which contain these elements. The oxides and salts of the named metals, particularly oxides, carbonates, and halides of the metals are preferred. The oxides, halides, and carbonates of zinc and cadmium are particularly preferred. Some examples of suitable catalytic compounds include metallic cadmium, cadmium oxide, cadmium iodide, cadmium chloride, cadmium fluoride, cadmium sulfate, cadmium phosphate, cadmium carbonate, cadmium acetate, cadmium soaps, cadmium benzoate, cadmium phthalate, metallic zinc, zinc oxide, zinc iodide, zinc chloride, zinc sulphate, zinc phosphate, zinc phthalate, zinc isophthalate, and the like.

The conversion of the alkali metal carboxylate is effected substantially completely in the absence of oxygen or water. In general, temperatures in the range of about 350 to 500° C. are employed, more preferably in the range of 400 to 450° C.

The process of this invention can be carried out in an inert atmosphere. Gases which are substantially completely nonreactive to the reaction environment can be employed. Examples of such inert gases include nitrogen, methane, argon, neon, butane, ethane, helium and the like. In one embodiment of the invention there is utilized an atmosphere which contains additionally at least 50 mol percent carbon dioxide. However, the presence of carbon dioxide in the atmosphere in which the thermal conversion is carried out is not essential to the obtaining of the high conversion of initial reactant. In addition, carbon monoxide or a mixture of CO and $CO_2$ can be used in carrying out the process of the invention.

Pressures in the range of 0 p.s.i.g. to 5000 p.s.i.g. or more can be employed but it is advantageous and preferable, in keeping with one preferred embodiment of the instant invention, that lower pressures in the range of 0 to 1000, preferably 0 to 10 p.s.i.g., be employed.

Sufficient reaction time should be employed to effect the desired degree of conversion. Generally reaction times in the range of about 5 minutes to about 48 hours are suitable.

Diluents for the reaction system can be employed as desired and can constitute up to 80 weight percent of the reaction medium. Any diluent can be employed which is substantially nonreactive to the reaction environment. Examples of suitable diluents include heptane, benzene, naphthalene, particulate silica, particulate carbon, cyclohexane, and the like.

Although not required, the conversion can be effected in the presence of an alkali metal or an alkaline earth metal carbonate. Normally such compounds, when utilized, are employed in an amount in the range of about 0.1 to 100 g. of carbonate for each gram mol of alkali metal aromatic carboxylate, preferably in the range of 1 to 50 grams per gram mol. The presence of such compounds is conventionally considered to promote acid-binding in the system. In place of the carbonates the salts of other weak acids may be used, for example, the bicarbonates, formates, or oxalates.

Also, although not required, it is within the scope of the invention to carry out the process of the invention in the presence of one or more compounds which are capable of binding or combining with the water formed by the reaction without interfering with the reaction proper.

Such compounds are, for example, various metal carbides such as aluminum carbide or the carbides of the alkali metals or alkaline earth metals such as calcium carbide. Also, other compounds of such metals, for example their nitrides or borides, may be used. Free metals which readily react with water under the prevailing reaction conditions, for example aluminum, may also be used. The binding of the water formed by the reaction may also be accomplished with the aid of suitable salts for example, with alkali metal carbonates, especially potassium carbonate.

If the starting materials are solids, they are preferably used in dry and finely divided form and are intimately mixed with each other. In order to avoid local overheating and decomposition cause thereby, as well as to avoid caking of the reaction mixture, it is sometimes advantageous to maintain the reaction mass in motion. This may be accomplished, for example, by carrying out the reaction in vessels provided with a stirring device, in screw conveyors or in rocker or rotary autoclaves. However, uniform heating may also be effected by distributing the starting materials in thin layers and in this method the reaction mixture may be agitated or may remain stationary. Good yields, however, are also obtained without these special measures provided care is taken that local overheating is avoided. The process may also be carried out in a fluidized bed of the solid starting materials.

The following examples will enable persons skilled in the art to better understand and practice the invention and are not intended to be limitative.

In each of the following examples conversion was calculated by: (1) calculating the weight of benzoic acid which was equivalent to the weight of potassium benzoate which was converted to any product; (2) calculating the weight of benzoic acid which was equivalent to the weight of the potassium benzoate charged; (3) dividing the weight of benzoic acid calculated in 1 by the weight of benzoic acid calculated in 2; and (4) multiplying the value calculated in 3 by 100. Efficiently was calculated by determining the weight of potassium terephthalate formed, converting that weight to an equivalent weight of terephthalic acid, dividing that value by the weight of benzoic acid calculated in 1 above, and multiplying the resultant value by 100. Quantities of carboxylates and/or polycarboxylates were calculated by converting the carboxylates and/or polycarboxylates to the respective methyl esters by reaction with methanol and sulfuric acid, and subsequently determining the quantities of the respective methyl esters by gas chromatography in comparison with known authentic standards.

Example I

A total of 3.2 g. of potassium benzoate and varying amounts of potassium phenoxide, potassium carbonate, and zinc oxide were charged to a reactor in each of the runs noted below in Table 1. The reactors of all runs were pressured with 840 p.s.i.g. of carbon dioxide. Each reactor was then sealed. Temperature was brought to 800° F. and maintained there for 1 hour in each run. All handling of the reactants prior to time that the reactors were sealed was done in a dry box.

The following results were obtained:

TABLE 1

| Run No. | PhOK[1] (g.) | $K_2CO_3$ (g.) | ZnO (g.) | Conversion (percent) | Efficiency (percent) |
|---|---|---|---|---|---|
| 1 | 0.20 | 1.60 | 0.10 | 44 | 50 |
| 2 | 0.10 | 0.40 | 0.10 | 48 | 57 |
| 3 (control) | 0.00 | 1.60 | 0.10 | 12 | 0 |

[1] Potassium phenoxide.

The above data show that employment of potassium phenoxide adjuvant according to the process of this invention effects considerably improved production of potassium terephthalate.

Example II

Further runs were made according to the procedure of Example I, except that 0 p.s.i.g. rather than 840 p.s.i.g. of carbon dioxide pressure was employed. Table 2 below presents results from these runs, Run 4 and Control Run 5, which further demonstrate the improved results effected by the use of an alkali metal derivative of phenol to promote the synthesis of aromatic polycarboxylates at relatively low pressures of carbon dioxide.

| Run No. | PhOK[1] (g.) | $K_2CO_3$ (g.) | ZnO (g.) | Conversion (percent) | Efficiency (percent) |
|---|---|---|---|---|---|
| 1 | 0.20 | 0.40 | 0.20 | 7 | 65 |
| 2 (control) | 0.00 | 0.40 | 0.10 | 0 | 0 |

[1] Potassium phenoxide.

Example III

Further runs were made according to the procedure of Example I except that $CdCO_3$ rather than ZnO was employed as a catalyst, and one atmosphere pressure of $CO_2$ rather than 840 p.s.i.g. was employed. Table 3, below, presents data which demonstrate the improved results of this invention wherein low pressure $CO_2$ is employed:

TABLE 3

| Run No. | PhOK (g.) | $K_2CO_3$ (g.) | $CdCO_3$ (g.) | $CO_2$ (atm.) (abs.) | Conversion (percent) | Efficiency (percent) |
|---|---|---|---|---|---|---|
| 1 | 0.20 | 0.40 | 0.20 | 1 | 93 | 66 |
| 2 | 0.10 | 0.40 | 0.20 | 1 | 76 | 61 |
| 3 (control) | 0.00 | 0.40 | 0.20 | 1 | 3 | |

These excellent results effected in the presence of $CO_2$ at only atmospheric pressure demonstrate that the process of this invention is particularly valuable in that it can be operated continuously without special equipment. This is an important advantage, because similar processes have generally of necessity been operated batchwise in the past because of the difficulty of charging a solid to a high pressure reaction zone continuously.

Example IV

A further series of runs were carried out using 3.2 g. of potassium benzoate and amounts of potassium phenoxide and cadmium carbonate as noted in Table 4 below. The reactors for all runs utilized an atmosphere of nitrogen. The nitrogen pressure was 0 p.s.i.g. at 80° F. Following sealing, the reactors were heated to a temperature of 432 to 435° C. and maintained there for a period of 1 hour in each run. The following results were obtained:

TABLE 4

| Run No. | PhOK (g.) | $CdCO_3$ (g.) | Conversion (percent) | Efficiency (percent) | Terephthalic acid, wt. percent |
|---|---|---|---|---|---|
| 1 | 0.2 | 0.2 | 82 | 45 | 94 |
| 2 | 0 | 0.2 | 8 | 32 | <5 |

The above data show that good conversion of the monocarboxylate is obtained at low pressure in accordance with the invention utilizing an inert atmosphere of nitrogen and a conventional disproportionation catalyst system whereas the system, not having the R—X—M type adjuvant therein, gave poor conversion with substantially less production of desired polycarboxylate.

Example V

A further series of runs were carried out using 3.2 grams of potassium benzoate, 0.40 gram of potassium carbonate, 0.20 gram of cadmium carbonate, and potassium thiophenoxide as noted. The reactors for all runs utilized an atmosphere of carbon dioxide (0 p.s.i.g. at 80° F.). Following sealing, the reactors were heated to a temperature of 810°

F. and maintained there for a period of 1 hour in each run. The following results were obtained:

TABLE 5

| Run No. | PhSK | $CO_2$ p.s.i.g. | Conversion (percent) | Efficiency (percent) |
|---|---|---|---|---|
| 1 | 0.20 | 0 | 68 | 57 |
| 2 (control) | 0.00 | 0 | 3 | |

The above data show that potassium thiophenoxide can be used to promote the disproportionation of potassium benzoate in the presence of a cadmium catalyst.

Example VI 3.2 g. of potassium benzoate and varying amounts of potassium phenoxide, potassium carbonate, and zinc oxide were charged to a reactor in each of the runs noted below in Table 6. Each reactor except the reactor of Control Run 7 was pressured with 1,000 p.s.i.g. at atmospheric temperature of carbon monoxide subsequent to flushing the reactor with carbon monoxide. In Control Run 7, atmospheric pressure was employed. Each reactor was then sealed. Temperature was brought to 800° F. and maintained there for 1 hour. All handling of reactants prior to the time that the reactors were sealed was done in a dry box. The following results were obtained:

TABLE 6

| Run No. | PhOK[1] (g.) | $K_2CO_3$ (g.) | ZnO (g.) | CO pressure (p.s.i.g.) at atm. temp. | Conversion (percent) | Efficiency (percent) |
|---|---|---|---|---|---|---|
| 1 | 0.40 | 1.60 | 0.40 | 1,000 | 76 | 92 |
| 2 | 0.20 | 1.60 | 0.20 | 1,000 | 60 | 88 |
| 3 | 0.80 | 1.60 | 0.10 | 1,000 | 78 | 59 |
| 4 | 0.40 | 1.60 | 0.10 | 1,000 | 75 | 82 |
| 5 | 0.10 | 0.10 | 0.10 | 1,000 | 12 | |
| 6 (control) | 0.00 | 1.60 | 0.10 | 1,000 | <2 | 0 |
| 7 (control) | 0.20 | 0.40 | 0.20 | 0 | 7 | 65 |

[1] PhOK is potassium phenoxide.

Example VII

Further runs were made according to the procedure of Example VI except that varied reaction times were employed, and a reaction temperature of 850° F. was employed rather than 800° F. In each of the following runs presented in Table 7 below, 0.10 g. of potassium phenoxide, 0.40 of potassium carbonate, and 0.10 g. of zinc oxide were employed.

TABLE 7

| Run No. | CO pressure (p.s.i.g.) at atm. temp. | Reaction time (hr.) | Conversion (percent) | Efficiency (percent) |
|---|---|---|---|---|
| 1 | 1,000 | 2.0 | 91 | 82 |
| 2 | 1,000 | 1.0 | 91 | 69 |
| 3 | 1,000 | 0.5 | 89 | 67 |
| 4 | 1,000 | [1] 0.0 | 80 | 64 |

[1] The reactor was cooled immediately after reaching 850° F.

Example VIII

Another series of runs were carried out according to the procedure of Example VI using the amounts of the various compounds as shown in Table 8 and a temperature of 825° F. A total of 0.40 gram of potassium carbonate and 0.10 g. of zinc oxide were employed in each run. The following results were obtained:

TABLE 8

| Run No. | PhOH[1] (g) | CO pressure (p.s.i.g.) at atm. temp. | Conversion (percent) | Efficiency (percent) |
|---|---|---|---|---|
| 1 | 0.20 | 1,000 | 97 | 67 |
| 2 | 0.10 | 1,000 | 89 | 84 |
| 3 | 0.05 | 1,000 | 77 | 75 |
| 4 (control) | 0.00 | 1,000 | 17 | |

[1] PhOH is phenol.

The above data show that a compound of the formula R—O—H can be employed according to the process of this invention.

Example IX

A series of runs were carried out according to the procedure of Example VI using potassium t-butoxide in the amounts as noted in Table 9. The following results were obtained:

TABLE 9

| Run No. | t-BuOK[1] (g.) | $K_2CO_3$ (g.) | ZnO (g). | CO pressure (p.s.i.g.) at atm. pressure | Conversion (percent) | Efficiency (percent) |
|---|---|---|---|---|---|---|
| 1 | 0.40 | 0.40 | 0.10 | 1,000 | 77 | 68 |
| 2 | 0.10 | 0.40 | 0.10 | 1,000 | 14 | |
| 3 | 0.00 | 1.60 | 0.10 | 1,000 | <2 | 0 |

[1] Potassium t-butoxide.

The above data demonstrate that an alkali metal alkoxide can be employed as adjuvant in accordance with the process of this invention.

Example X

A total of 3.2 g. of potassium benzoate, 0.10 g. of potassium phenoxide, 0.40 g. of potassium carbonate, and 0.10 g. of zinc oxide were charged to each reactor of the runs noted below in Table 10. $CO_2$, CO, or mixtures thereof were pressured to the respective reactors in the amounts noted subsequent to flushing the respective reactors therewith. CO was pressured at 1000 p.s.i.g. and $CO_2$ was pressured at 840 p.s.i.g. Each reactor had a total volume of 25 cc. Each reactor was then sealed. Temperature was brought to 800° F. and maintained there for 1 hour. All handling of reactants prior to the time that the reactors were sealed was done in a dry box. The following results were obtained:

TABLE 10

| Run No. | CO charged (g.) | $CO_2$ charged (g.) | Conversion (percent) | Efficiency (percent) |
|---|---|---|---|---|
| 1 | 2.13 | 1.45 | 72 | 84 |
| 2 | 2.51 | 0.49 | 78 | 81 |
| 3 | 2.70 | 0.20 | 74 | 83 |
| 4 (control) | 0.00 | 6.02 | 48 | 57 |
| 5 (control) | 2.40 | 0.00 | 44 | 80 |
| 6 (control) | 2.75 | 0.00 | 36 | 83 |

Reasonable variations and modifications of this invention can be made, or followed, in view of the foregoing disclosure, without departing from the spirit or scope thereof.

I claim:

1. In the disproportionation process for the disproportionation of an alkali metal aromatic carboxylate compound of the formula $AR(COOM)_n$, wherein AR is an aromatic hydrocarbon or alkyl-substituted aromatic hydrocarbon group having from 6 to 15 carbon atoms therein and each having up to 3 alkyl substituents each containing up to and including 6 carbon atoms, M is an alkali metal and n is 1, 2 or 3, so as to form an aromatic polycarboxylate containing at least one additional carboxyl group by heating said aromatic carboxylate in an inert atmosphere in the presence of a disproportionation catalyst, the improvement which comprises carrying out said disproportionation process in the presence of at least one adjuvant compound of the formula R—X—M wherein R is an alkyl, cycloalkyl, aryl radical or combination thereof having from 1 to 15 carbon atoms therein, X is oxygen or sulfur, and M is hydrogen or an alkali metal.

2. The process of claim 1 wherein said adjuvant is present in an amount in the range of about 0.001 to 2 moles per mol of alkali metal aromatic carboxylate.

3. The process of claim 1 wherein there is additionally present an alkali metal carbonate in an amount in the range of 0.1 to 100 g. of carbonate per gram mol of alkali metal aromatic carboxylate.

4. The process of claim 1 wherein there is additionally present an alkaline earth carbonate in an amount in the range of 0.1 to 100 g. of carbonate per gram mol of alkali metal aromatic carboxylate.

5. The process of claim 1 wherein said alkali metal aromatic carboxylate is potassium benzoate.

6. The process of claim 1 wherein said adjuvant is phenol.

7. The process of claim 1 wherein said adjuvant is potassium phenoxide.

8. The process according to claim 1 wherein said adjuvant is potassium t-butoxide.

9. The process according to claim 1 wherein said adjuvant is potassium thiophenoxide.

References Cited

UNITED STATES PATENTS

| | | | |
|---|---|---|---|
| 3,479,399 | 11/1969 | Murase et al. | 260—515 |
| 3,487,106 | 12/1969 | Patton et al. | 260—515 |

JAMES A. PATTEN, Primary Examiner

V. GARNER, Assistant Examiner

U.S. Cl. X.R.

252—428, 429, 430